United States Patent
Okamoto et al.

(10) Patent No.: US 7,418,622 B2
(45) Date of Patent: Aug. 26, 2008

(54) STORAGE CONTROL SYSTEM AND STORAGE CONTROL METHOD

(75) Inventors: Takeki Okamoto, Odawara (JP); Mikio Fukuoka, Odawara (JP); Eiju Katsuragi, Odawara (JP)

(73) Assignee: Hitachi, Ltd., Tokyo (JP)

(*) Notice: Subject to any disclaimer, the term of this patent is extended or adjusted under 35 U.S.C. 154(b) by 588 days.

(21) Appl. No.: 11/146,050

(22) Filed: Jun. 7, 2005

(65) Prior Publication Data

US 2006/0212747 A1   Sep. 21, 2006

(30) Foreign Application Priority Data

Mar. 17, 2005   (JP)   ............... 2005-077543

(51) Int. Cl.
    *G06F 11/00* (2006.01)
(52) U.S. Cl. .................................................. 714/6
(58) Field of Classification Search ................. 714/6–8, 714/13, 15, 42, 700
    See application file for complete search history.

(56) References Cited

U.S. PATENT DOCUMENTS

| | | | |
|---|---|---|---|
| 6,598,174 B1 * | 7/2003 | Parks et al. ................ | 714/6 |
| 6,931,519 B1 * | 8/2005 | Keller ........................ | 713/1 |
| 7,143,305 B2 * | 11/2006 | Hajji et al. .................. | 714/2 |
| 2005/0193273 A1 * | 9/2005 | Burkey ....................... | 714/42 |
| 2006/0212752 A1 * | 9/2006 | Mechalke et al. ............ | 714/7 |

FOREIGN PATENT DOCUMENTS

| | | |
|---|---|---|
| JP | 06-139027 A | 5/1994 |
| JP | 11-191037 A | 7/1999 |
| JP | 2002-297322 A | 10/2002 |

* cited by examiner

*Primary Examiner*—Nadeem Iqbal
(74) *Attorney, Agent, or Firm*—Antonelli, Terry, Stout & Kraus, LLP.

(57) ABSTRACT

A storage system enabling effective use of storage resources by immediately releasing a storage device provided as a spare from data recovery processing for a faulty storage device. Even before the completion of the collection copy, the faulty disk drive may be replaced with a new disk drive and a relevant control unit in the storage system recognizes this replacement and has data in the spare disk drive automatically copied back to the new disk drive.

12 Claims, 11 Drawing Sheets

STORAGE CONTROL SYSTEM AND STORAGE CONTROL METHOD

CROSS-REFERENCE TO RELATED APPLICATIONS

This application relates to and claims priority from Japanese Patent Application No. 2005-077543, filed on Mar. 17, 2005, the entire disclosure of which is incorporated herein by reference.

BACKGROUND OF THE INVENTION

The present invention relates to a storage control system and a storage control method. In particular, it relates to a storage control system connected to host systems and storing, according to a RAID method, data transmitted between itself and the host systems in hard disk drives (HDDs) arranged in arrays, and a storage control method for the storage control system.

This type of the storage control system is known as one having: drives containing rotatable-type storage devices for storing data; and storage controllers existing between the drives and host systems and controlling data transmission therebetween. Such a storage control system is disclosed in Japanese Patent Laid-Open Publication No. H11-191037.

The above publication describes that, when a failure occurs in a disk drive in an ECC group (RAID group) and prohibits the operation of the disk drive, the entire data in the faulty drive is recovered based on the data in the remaining drives in the group and copied to spare disk drive(s) (collection copy).

Japanese Patent Laid-Open Publication No. 2002-297322 discloses a storage control system having spare disk drives. With this storage control system, in the case of failure in any one of disk drives constituting the RAID groups, data is recovered based on data in the remaining disk drives in the RAID group so that the RAID operation mode recovers from a degeneration mode to a normal access mode in which all the disk drives constituting the RAID operate.

Japanese Patent Laid-Open Publication H6-139027 discloses a storage control system having: disk array controller(s); disk drives arranged in arrays, connected to the disk array controller(s) via drive interface(s), and storing a plurality of pieces of data; and data backup device(s) for backing up the data stored in the disk drives. In this storage control system, some of the disk drives are used as spare disk drives and the rest are used as data/parity disk drives, and when a failure occurs in a data/parity disk drive, a spare disk drive is set as a data/parity disk drive in place of the faulty data/parity disk drive.

With these conventional storage control systems, when a failure occurs in a disk drive, they commence the collection copy and a maintenance person who is informed of that commencement checks the completion of the collection copy and replaces the faulty disk drive with a normal one. After the replacement, the maintenance person gives a command to the storage control systems to copy back the storage information in the spare disk drives to the new disk drive.

SUMMARY OF THE INVENTION

However, these conventional storage control systems have problems in that, if the maintenance person causes delay in replacing the disk drive, the spare disk is placed under the control of the collection copy during the delay, thereby preventing the effective use of the spare disk. Moreover, having many spare disk drives in case of further failures in the disk drives contradicts the idea of effective use of storage resources as long as the storage control system has a limit in its total storage capacity.

Thereupon, the present invention aims to provide a storage control system enabling the effective use of storage resources by immediately releasing storage devices provided as spares from the data recovery processing of faulty storage devices.

In order to achieve the above object, the present invention is characterized in that, even before the completion of the aforementioned collection copy, a faulty disk drive can be replaced with a new disk drive and data in a spare disk drive is automatically copied back to the new disk drive upon a controller's recognition of the replacement.

Specifically, the present invention provides a storage control system having a storage device and a controller for controlling data transmission between the storage device and a host system, wherein, the storage device has a plurality of storage media together constituting a RAID group, and a spare medium to which storage information in a faulty storage medium is saved; and the controller executes, based on a control program, the steps of: (a) detecting a failure in the storage media; (b) recovering storage information in the faulty storage medium based on storage information in the remaining storage media in the RAID group, and copying the storage information to the spare medium; (c) reporting the failure in the storage medium to a management terminal; (d) before all storage information in the faulty storage medium is copied to the spare medium, detecting the faulty storage medium's having been replaced with another storage medium; and (e) conditional on the detection in step (d), copying back the storage information in the spare medium to the replacement storage medium.

A preferable embodiment of the present invention has the following characteristics: The controller further executes a step of detecting that the copying of all storage information in the faulty storage medium to the spare medium has been completed, and starts the step (e) immediately after the detection of such completion; Upon detecting the replacement with the other storage medium in step (d), the controller immediately copies back the storage information in the spare medium to the other replacement storage medium even before the completion of the copying of all storage information in the faulty medium to the spare medium; The controller has a storage area for storing a data group, of data transmitted from the host system, that cannot be written to the storage device, executes a further step of detecting the completion of writing of this data group to the spare medium, and, after the detection, copies back the storage information in the spare medium to the other replacement storage medium; and The controller further executes a step of mapping the spare medium on to the RAID group that includes the faulty storage medium.

The present invention also provides a storage control system having: a channel control unit for controlling an I/O request to a storage device in response to a data input/output request from a host system; a disk control unit for controlling the data I/O request to the storage device; a shared memory for storing control information; a cache memory for temporarily storing control data; a disk storage device as the storage device connected to the disk control unit; and a connector connecting the channel control unit, the disk control unit, the shared memory, and the cache memory to one another, the disk storage device having a plurality of disk drives constituting a RAID group and a spare disk drive to which storage information in a faulty disk drive is saved, wherein, the shared memory has: a first area for storing information regarding a fault in the disk drives and the position of the faulty disk drive; a second area for storing information for mapping the remaining disk drives in the RAID group to which the faulty disk drive belongs, on to the spare disk drive; and a third area for storing control information indicating that the faulty disk drive has been replaced with another disk drive before the coping of all storage information in the faulty disk drive to the spare disk drive has been completed; and the disk control unit executes the steps of: based on the information in the first area, reporting the disk drive fault to a management terminal; based on the information in the second area, recovering the storage information in the faulty disk drive based on storage information in the remaining disk drives in the RAID group and copying the recovered storage information to the spare disk drive; and based on the information in the third area, copying back the storage information in the spare disk drive to the replacement disk drive.

In another preferable embodiment of the present invention, the shared memory further has a fourth area for storing information indicating that the copying of the storage information from the faulty disk drive to the spare disk drive has been completed, and based on the information in the third and fourth areas, and immediately after the completion of the copying from the faulty disk drive to the spare disk drive, the disk control unit copies back the storage information in the spare disk drive to the replacement disk drive. Moreover, based on the information in the third area, the storage control unit immediately copies back the storage information in the spare disk drive to the replacement disk drive.

Accordingly, the present invention can provide a storage control system enabling effective use of storage resources, because storage devices provided as spares can be immediately released from data recovery processing of faulty storage devices.

DETAILED DESCRIPTION OF THE INVENTION

Figure 1:
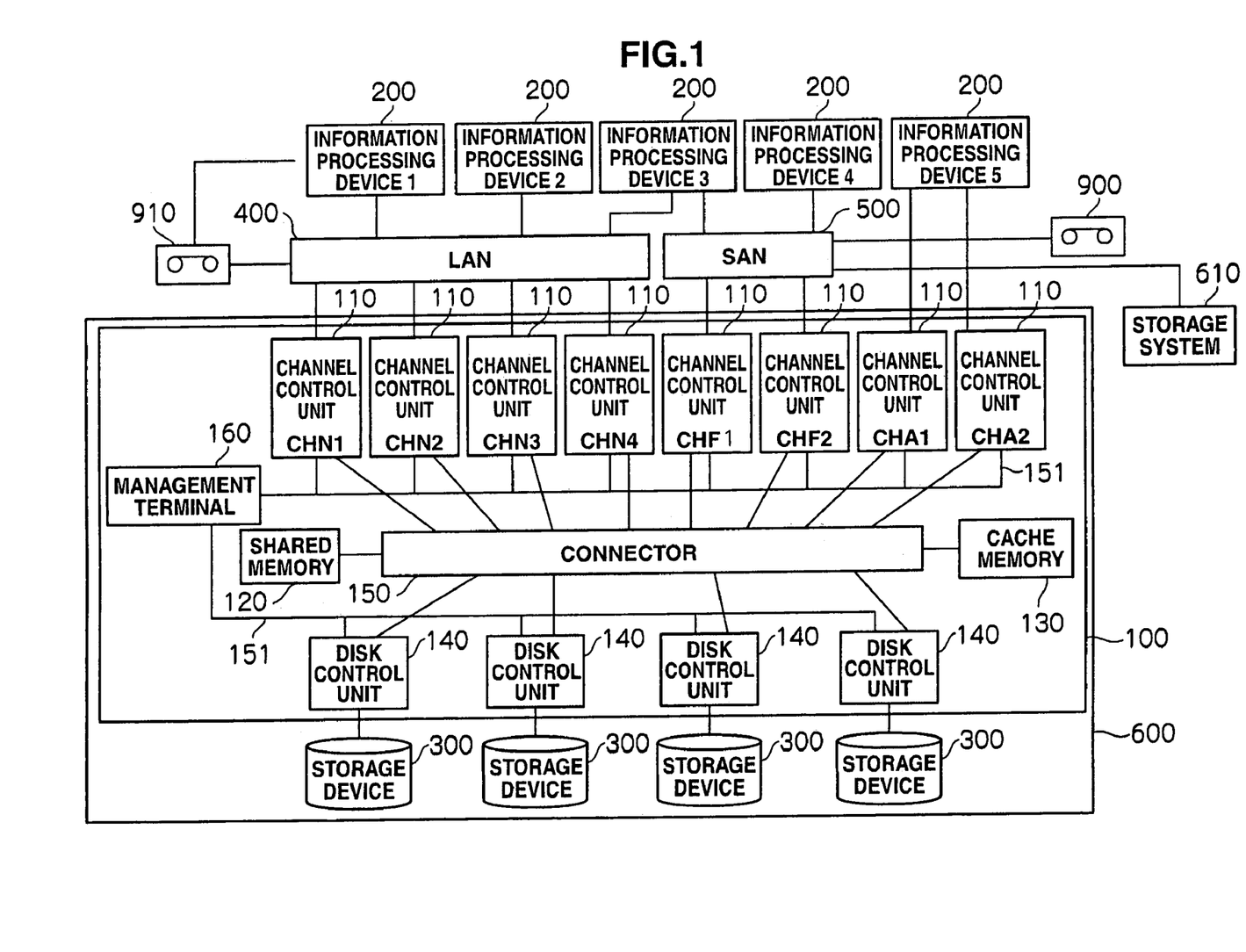
FIG. 1 shows a configuration of a storage system according to an embodiment of the present invention.

An embodiment of the present invention will be explained with reference to the drawings. FIG. 1 is a block diagram showing a configuration of a storage system (storage control system) 600 to which the present embodiment of the present invention is applied.

The storage system 600 is composed of: a plurality of storage devices 300; and a storage device controller 100 for controlling input/output to/from the storage devices 300 in response to input/output requests from information processing devices (host systems) 200.

An information processing device 200 is a computer device having a CPU and memory and configured as, for example, a workstation, a mainframe computer, a personal computer, or the like, or it may be configured as a plurality of computers connected to each other via a network. The information processing device 200 is equipped with an application program which operates on an operating system. Examples of the application program include automatic teller machine systems for banks and airline seat reservation systems.

Information processing devices 1 to 3 (200) are connected to the storage system 600 via a Local Area Network (LAN) 400. The LAN 400 is a communication network such as Ethernet (registered trademark) or FDDI, and the communication between the information processing devices 1 to 3 (200) and the storage system 600 is conducted using TCP/IP protocol.

The information processing devices 1 to 3 (200) transmit file name-specific data access requests (file-by-file data input/output requests, hereinafter called "file access requests") to channel control units CHN 1 to 4 (110) on the storage system 600 side. The channel control units CHN 1 to 4 will be described later.

A backup device 910 is also connected to the LAN 400. The backup device 910 is, for example, a disk type device such as an MO, a CD-R, or a DVD-RAM, or a tape type device such as a DAT tape, a cassette tape, an open tape, or a cartridge tape.

Through communications with the storage device controller 100 via the LAN 400, the backup device 910 stores backup data of data stored in the storage devices 300. The backup device 910 is also connected to the information processing device 1 (200), accordingly it can obtain backup of the data stored in the storage devices 300 via the information processing device 1 (200).

The storage device controller 100 has channel control units CHN 1 to 4 (110). Via these channel control units CHN 1 to 4 (110) and the LAN 400, the storage device controller 100 passes write access or read access among the information processing devices 1 to 3 (200), the backup device 910, and the storage devices 300. The channel control units CHN 1 to 4 (110) individually receive file access requests from the information processing devices 1 to 3 (200). Specifically, the channel control units CHN 1 to 4 (200) are individually assigned with network addresses (for example, IP addresses) on the LAN 400 and serve as NASes, thereby providing services as NASes to the information processing devices 1 to 3 (200) as if independent NASes exist.

With this configuration where one storage system 600 has the channel control units CHN 1 to 4 (110) individually serving as a NAS, conventional NAS servers individually operated at independent computers can be consolidated into one storage system 600. This enables overall management of the storage system 600 and improves efficiency in maintenance work such as various settings and controls, fault management, and version management.

Information processing devices 3 and 4 (200) are connected to the storage device controller 100 via a SAN 500. The SAN 500 is a network for transmitting, between the information processing device 3 and 4 (200) and the storage device controller 100, data block by block, which is a data execution unit for the storage areas provided by the storage devices 300. Communications between the information processing devices 3 and 4 (200) and the storage device controller 100 via the SAN 500 are generally conducted according to a fiber channel protocol. The information processing devices 3 and 4 (200) transmit, to the storage system 600, block-by-block data access requests (hereinafter called "block access requests") according to the fiber channel protocol.

A SAN-compatible backup device 900 is connected to the SAN 500. Through communications with the storage device controller 100 via the SAN 500, the SAN-compatible backup device 900 stores backup data of the data stored in the storage devices 300.

In addition to the channel control units 1 to 4 (110), the storage device controller 100 has channel control units CHF 1 and 2 (110). Via these channel control units CHF 1 and 2 (110), and the SAN 500, the storage device controller 100 conducts communications with the information processing devices 3 and 4 (200) and the SAN-compatible backup device 900.

An information processing device 5 (200) is connected to the storage device controller 100 without involving a network such as the LAN 400 or the SAN 500. This information processing device 5 (200) is, for example, a mainframe computer. Communication between the information processing device 5 (200) and the storage device controller 100 is conducted according to a communication protocol such as Fiber Connection (FICON, registered trademark), Enterprise System Connection (ESCON, registered trademark), Advanced Connection Architecture (ACONARC, registered trademark), or Fiber Connection Architecture (FIBARC). The information processing device 5 (200) transmits block access requests to the storage system 600 according to these communication protocols.

The storage device controller 100 communicates with the information processing device 5 (200) via the channel control units CHA 1 and 2.

Incidentally, another storage system 610 located somewhere away (a secondary site) from the installation site of the storage system 600 (primary site) may be connected to the SAN 500.

The storage system 610 is used as a data replicate-to device in relation to a replication or remote copy function. The storage system 610 may be connected, in addition to the SAN 500, to the storage system 600 via a communication line such as an ATM. In this case, a channel control unit having an interface (channel extender) for using the communication line is adopted as a channel control unit 110 connected to the SAN 500.

Because the storage system 600 is equipped with the co-resident channel control units CHN 1 to 4 (110), channel control units CHF 1 and 2 (110), and channel control units CHA 1 and 2 (110), the storage system 600 can be connected to different types of networks. In other words, the storage system 600 is a SAN-NAS integrated storage system when it is connected to the LAN 400 via the channel control units CHN 1 to 4 (110) and to the SAN 500 via the channel control units CHF 1 and 2 (110).

A connector 150 connects the individual channel control units 110, a shared memory 120, a cache memory 130, and disk control units 140 to one another. Transmission of commands and data between them is conducted via this connector 150. The connector 150 is configured with a high-speed bus such as a very-high-speed crossbar switch which transmits data by means of high-speed switching. Therefore, communication performance between the channel control units 110 can be remarkably enhanced and a high-speed file-sharing function and high-speed failover can be enabled.

The shared memory 120 and the cache memory 130 are memory devices shared between the channel control units 110 and the disk control units 140. The shared memory 120 is mainly used for storing control information including commands, while the cache memory 130 is mainly used for storing data. For example, when a channel control unit 110 receives a data input/output command from an information processing device 200 and the command is a write command, it writes the write command to the shared memory 120 and the write data received from the information processing device 200 to the cache memory 130.

The disk control units 140 monitor the shared memory 120 and when they judge that the write command has been written to the shared memory 120, a relevant disk control unit 140 reads the write data from the cache memory 130 in accordance with the write command and writes the write data to the storage device(s) 300.

On the other hand, when a data input/output command a channel control unit 110 receives from an information processing device 200 is a read command, the channel control unit 110 writes the read command to the shared memory 120 and checks whether or not the read target data exists in the cache memory 130. If the read target data exists in the cache memory 130, the channel control unit 110 reads the data from the cache memory 130 and transmits it to the information processing device 200.

If the read target data does not exist in the cache memory 130, relevant disk control units 140, upon detecting that the read command has been written to the shared memory 120, reads the read target data from the storage device(s) 300, writes it to the cache memory 130, and writes to that effect in the shared memory 120.

The relevant channel control unit 110 monitors the shared memory 120 and when it detects that the read target data has been written to the cache memory 130, it reads the data from the cache memory 130 and transmits it to the relevant information processing device 200.

The disk control units 140 convert logical address-specific data access requests, that are transmitted from the channel control units 110 to the storage devices 300, into physical address-specific data access requests so that data writing/reading to/from the storage devices 300 is conducted in response to the I/O requests output from the channel control units 110.

Because the storage devices 300 have a RAID configuration, the disk control units 140 execute data access according to the RAID configuration. The disk control units 140 also carry out replication controls and remote copy controls for the purpose of replication management of the data stored in the storage devices 300, backup controls, and data loss prevention in case of disaster (disaster recovery).

Each of the storage devices 300 has a single or plurality of disk drives (physical volumes), equivalent to storage media, and provides storage areas that can be accessed from the information processing devices 200. Each of the disk control units 140 has a plurality of ports, to which individual disk drives are connected.

Logical volumes are set for the storage areas provided by the storage devices 300, each logical volume being a combination of storage spaces of a single or plurality of physical volumes. The logical volumes set for the storage devices 300 include: user logical volumes that can be accessed from the information processing devices 200; and system logical volumes used for controlling the channel control units 110. The system logical volumes store an operating system which is run by the channel control units 110.

The logical volumes provided by the storage devices 300 are assigned logical volumes that can be accessed from the respective channel control units 110. One logical volume can be shared among plural channel control units 110.

Incidentally, for example, hard disk devices, flexible disk devices or the like can be used as the storage devices 300 (disk drives). They may configure RAID-style disk arrays for their storage configurations. The storage devices 300 and the storage device controller 100 may be directly connected or connected via a network. The storage devices 300 may be integrated with the storage device controller 100.

A management terminal 160 is a computer device for maintaining and managing the storage system 600 and is connected to the channel control units 110 and the disk control units 140 via the internal LAN 151. An operator (maintenance person) operates this management terminal (SVP; service processor) 160 and makes disk drive settings for the storage devices 300 and logical volume settings, and installs a micro program executed by the channel control units 110 and the disk control units 140. The management terminal 160 may be connected to the control units via a network.

Figure 2:
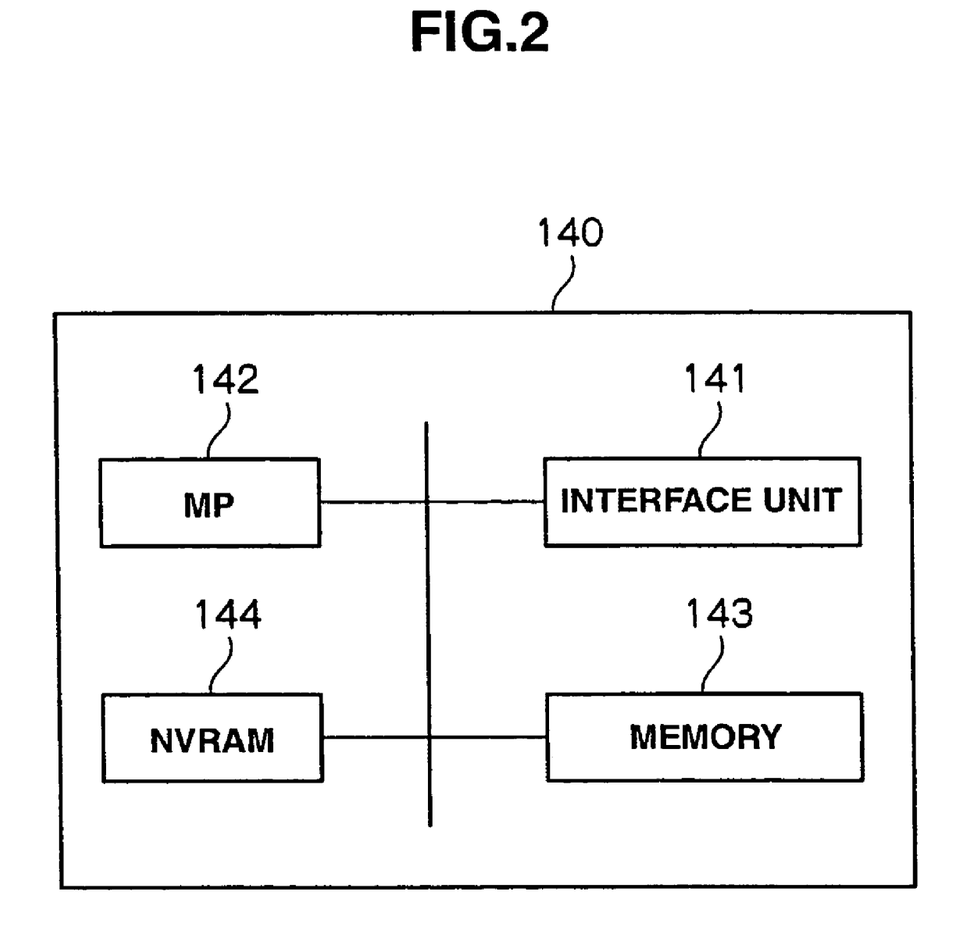
FIG. 2 shows a configuration of a disk control unit according to the present embodiment.

FIG. 2 shows a circuit configuration of a disk control unit 140. The disk control unit 140 is composed of: an interface unit 141; a micro processor (MP) 142; a memory 143 having a micro program stored therein, the micro program being a control program; and a NVRAM 144. These components are formed as an integrated unit on one or more circuit boards.

The interface unit 141 has communication interfaces for communications with the channel control units 110 via the connector 150 and with the storage devices 300.

The MP 142 carries out communication with the channel control units 110, storage devices 300 and the management terminal 160, and executes access control for the storage devices 300 and data replication management and the like.

The memory 143 and the NVRAM 144 store a micro program and data for executing various control processing.

Figure 3:
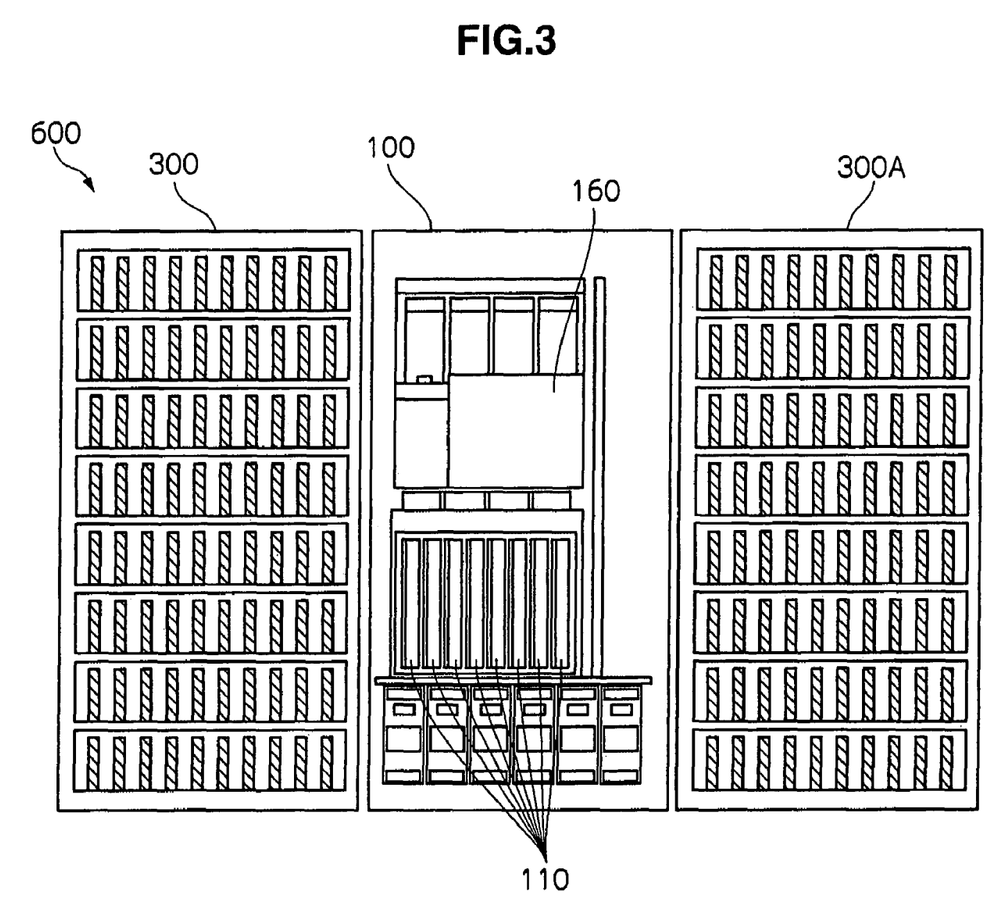
FIG. 3 shows an external configuration of the storage system according to the present embodiment.
Figure 4:
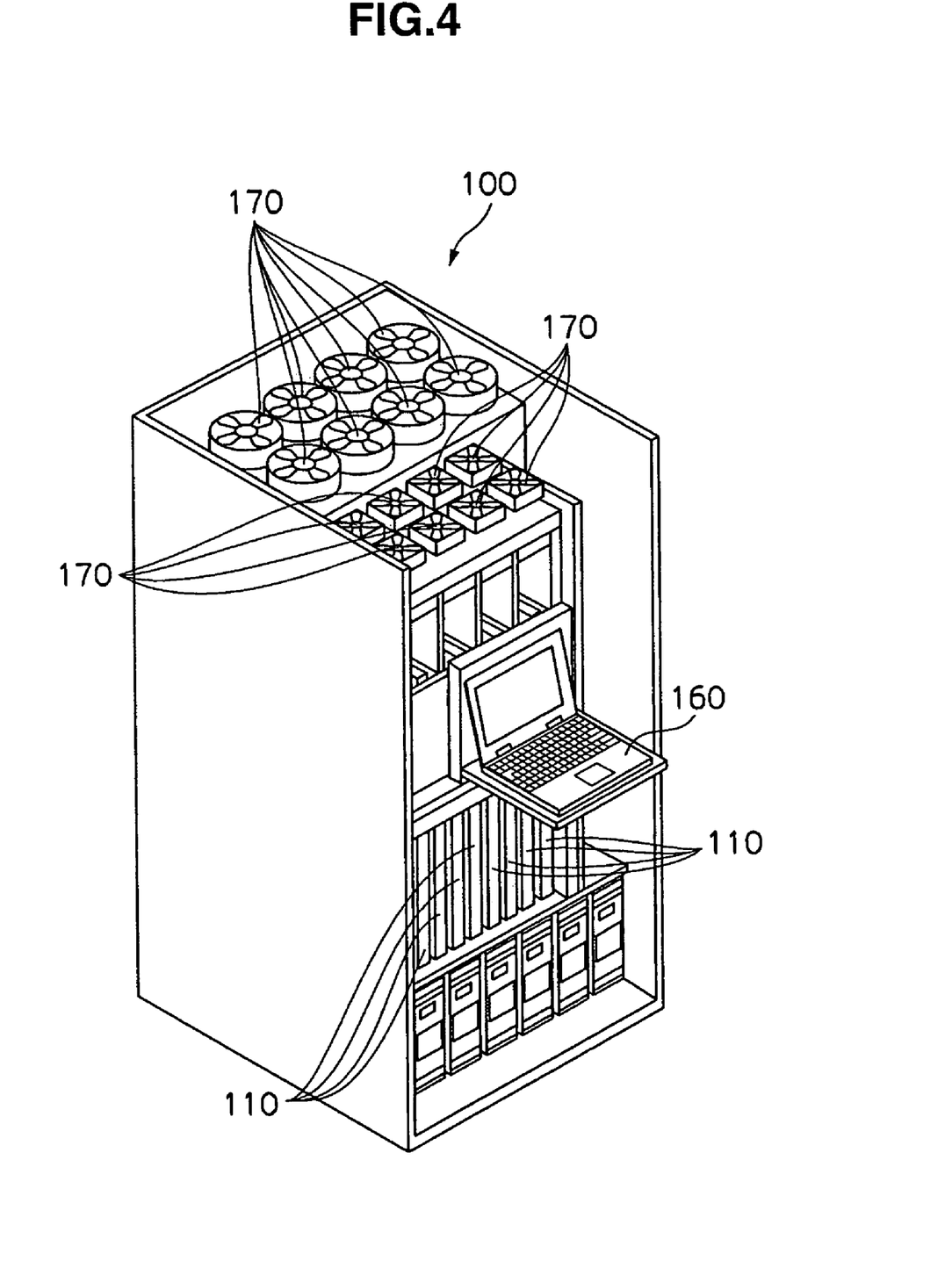
FIG. 4 shows another external configuration of the storage system according to the present embodiment.

FIGS. 3 and 4 show external configurations of the storage system 600. As FIG. 3 shows, the storage system 600 has a configuration where the storage controller 100 and memory apparatuses having the storage devices 300 loaded therein are individually contained in chassis. At the sides of the storage device controller 100, chassis 300A are located.

The storage device controller 100 has the management terminal 160 mounted in the central part on the front side. The management terminal 160 has a cover, which is opened when using the management terminal 160 as shown in FIG. 4. The management terminal 160 is in the form of a laptop personal computer in FIG. 4, but it may be any type of computer device.

The storage device controller 100 is also provided with fans 170 to remove heat generated at the boards and the like in the channel control units 110. The fans 170 are attached to the top of the storage device controller 100 as well as the top of slots for the channel control units 110.

The slots for inserting boards of the channel control units 110, disk control units 140, cache memory 130, and the shared memory 120 are provided below the management terminal 160. A board is a unit having a circuit board formed thereon and is an installation unit fitting the slots. The storage system 600 according to the present invention has a plurality of slots and FIGS. 3 and 4 show the situation where the boards are inserted into the slots.

Each slot has a guide rail for installing a board. The board is inserted into the slot along the guide rail and thus loaded in the storage device controller 110.

The board can be removed from the slot by pulling it along the guide rail. Each slot has, at the back end, a connecter for electrically connecting a board to the storage device controller 100.

Although the channel control units 110 include the channel control units CHN 1 to 4 (110), channel control units CHF 1 and 2 (110), and the channel control units CHA 1 and 2 (110), all the boards are compatible regarding their sizes, connector locations and connector pin arrangements. Accordingly, any of the channel control units 110 can be inserted into any of the eight slots. The same thing can be said about the boards of the disk control units 140.

Figures 11A, 11B:
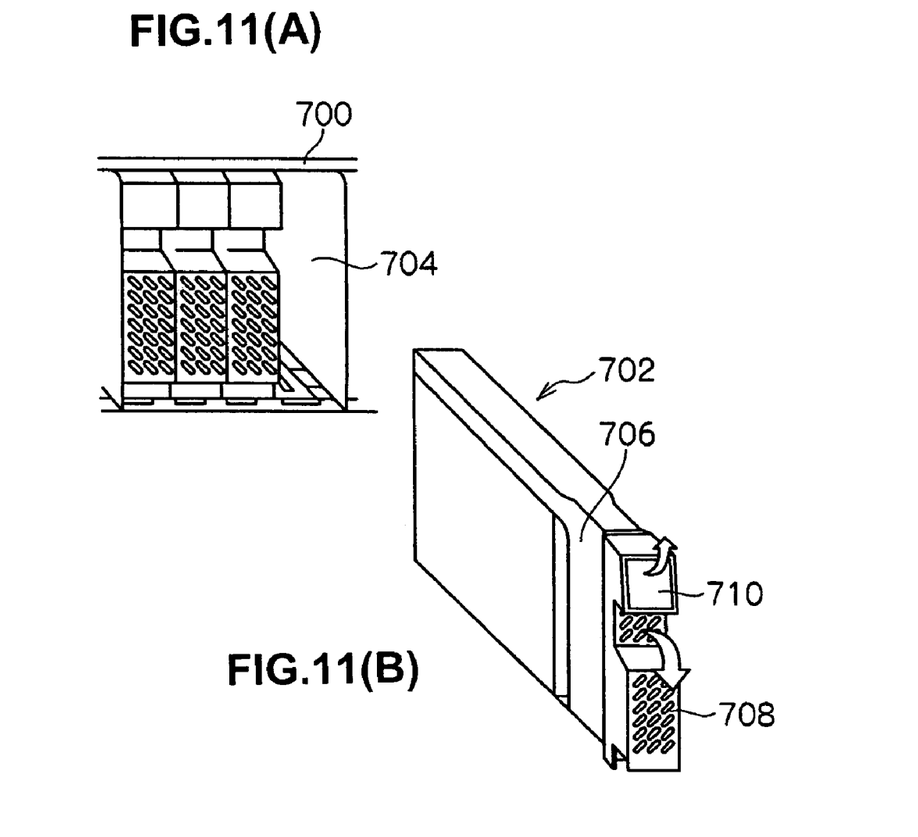
FIG. 11(A) is a perspective diagram showing the state where a plurality of HDDs are inserted into slots in a chassis.
FIG. 11(B) shows a front view of a single HDD.
Figure 11C:
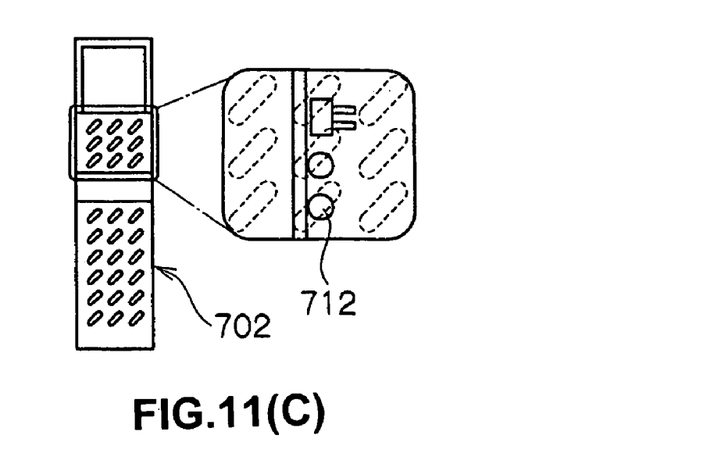
FIG. 11(c) shows further details.

FIGS. 11(A), 11(B) and 11(C) show the situation where a plurality of HDD boards 702 are inserted in slots 700 on the back side of the chassis. The reference numeral 704 indicates an insertion area for one HDD board, a faulty HDD board being pulled out of a slot. A HDD board is composed of a board main body 706 and a handle 708 fixed to the front face of the board main body 706. When removing a board from the slot, the maintenance person unlocks a stopper 710 which cannot be seen through when viewed from the front, and pulls the handle 708. On the other hand, when inserting, he/she pushes the board into the slot the whole way while holding the handle 708, and locks the stopper. Each board has a shutdown LED 712 on its front face. As will be described later, this shutdown LED 712 lights when a relevant disk control unit indicates board change. Accordingly, the maintenance person knows that the board with the light on should be replaced. The relevant disk control unit further shuts off I/O with the faulty HDD board. This is expressed as the board being logically closed. Incidentally, although a spare board can substitute for the faulty HDD board, if the faulty HDD board remains unreplaced, the other boards' I/O loads increase. Accordingly, it is preferable that the faulty HDD board be replaced immediately. When the faulty HDD board is replaced, a disk adapter recognizes the logical volume of the board and proceeds with the storage control processing.

As in the case of the channel control units, each of the HDDs constituting the storage devices in FIG. 1 is configured as a board having a peripheral circuit, a hard disk, and a driver, so that it can be inserted into a slot in the chassis 300A (FIG. 3). A faulty HDD is replaced with another HDD. When a replacement HDD board is inserted to a slot in the chassis, it electrically connects with the relevant disk control unit (FIG. 1).

The disk adapter has, for example, ports 0 to 4 individually corresponding to the storage device boards. Failures in the HDDs are detected and diagnosed, for each board, by the micro processors in the disk control units.

Figure 5A:
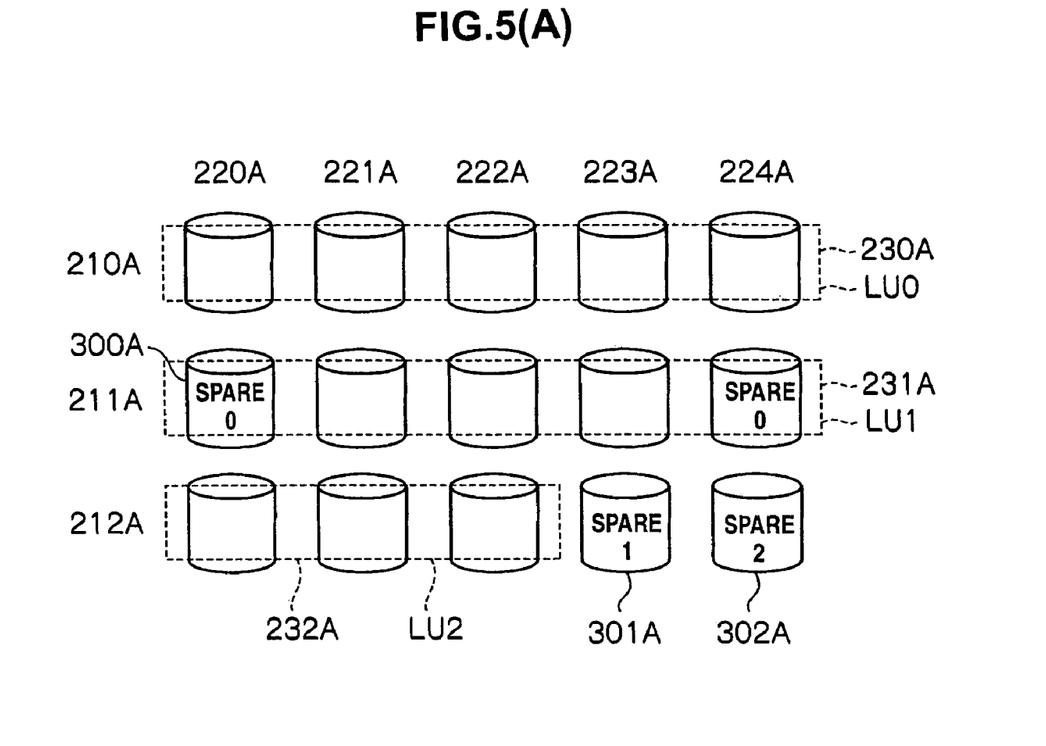
FIG. 5(A) and FIG. 5(B) each indicates a block diagram corresponding to an array configuration of disk drives.

Next, the RAID configuration of the storage devices will be explained based on FIGS. 5(A) and 5(B). As FIG. 5(A) shows, lines of physical tiers (PDEV) of the disk drives are regarded as arrays; horizontal arrays are ROWs (210A to 212A) and vertical arrays are PORTs (220A to 224A). For each ROW (210A to 212A) of the disk drives connected to the disk control units, a logical volume configuration in the case of redundancy provided to the storage configuration of the logical volumes by RAID 5 system (parity striping), is managed as a Logical Unit (LU) 0 to 2. Incidentally, the present invention can be applied to other RAID systems.

Some of the disk drives 200A are set as spare disk drives (300A, 301A) which are used as substitutes. These settings can be made at the management terminal through a graphical user interface. FIG. 5(A) shows the case where a failure occurs in a disk drive positioned in PORT 1 and ROW 0 constituting the logical volume LU0; the data in the faulty disk drive is recovered based on data in parity groups of the remaining disk drives in LU0, and the recovered data is collection-copied to a spare disk drive 301A (FIG. 5(B)). The reference code B' indicates a disk drive with which a faulty disk drive B was replaced and the data stored in the spare disk drive 301A is replication-copied (copied back) to the disk drive B'.

There are plural spare disk drives in the lines (array arrangements) of physical tiers of the disk drives. The micro program in a relevant disk control unit (see FIG. 1) reads, from the shared memory 120, the positions of the disk drives (A to E) constituting parity groups of the logical volume LU0 to which the faulty disk belongs, and the positions of available spare disk drives in the array arrangement; creates a table for mapping an optical spare disk on to the disk drives in a parity group requiring data recovery; and stores the table in a predetermined area in the shared memory 120.

The relevant disk control unit 140 refers to this table, recovers the data in the faulty disk drive based on data in the remaining disk drives in the RAID group to which the faulty disk drive belongs, and carries out a collection copy of the recovered data to the mapped spare disk drive.

Figure 6:
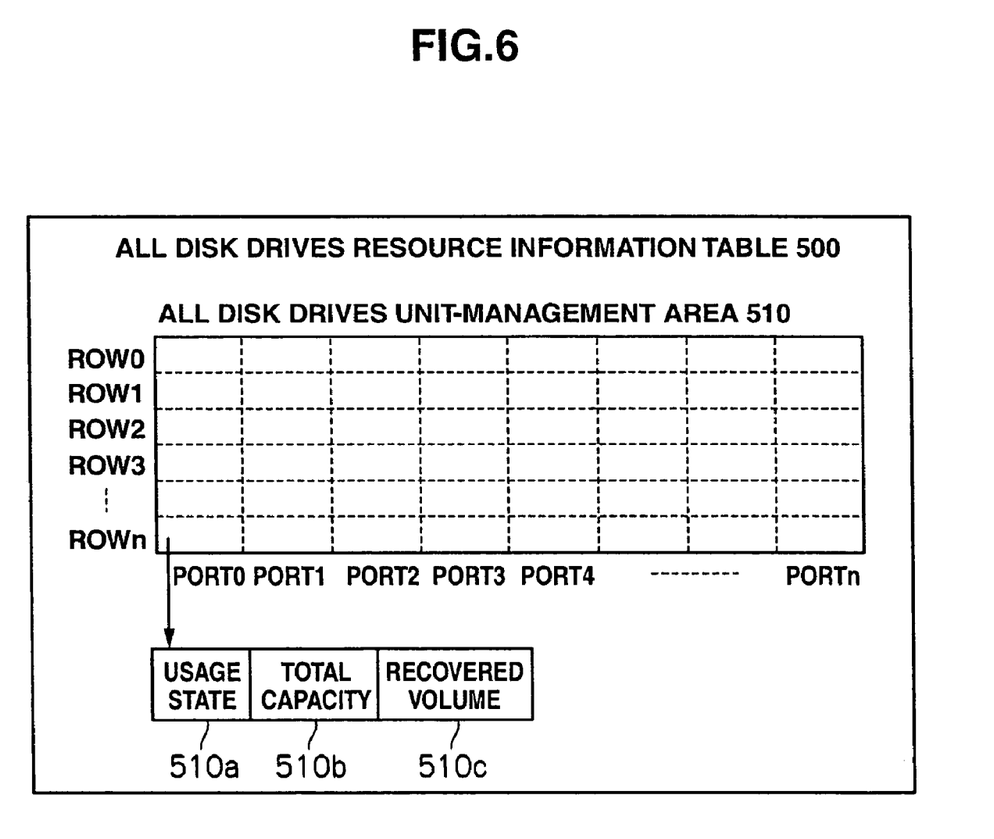
FIG. 6 shows a configuration of a data-disk-drive resource information table.
Figure 7:
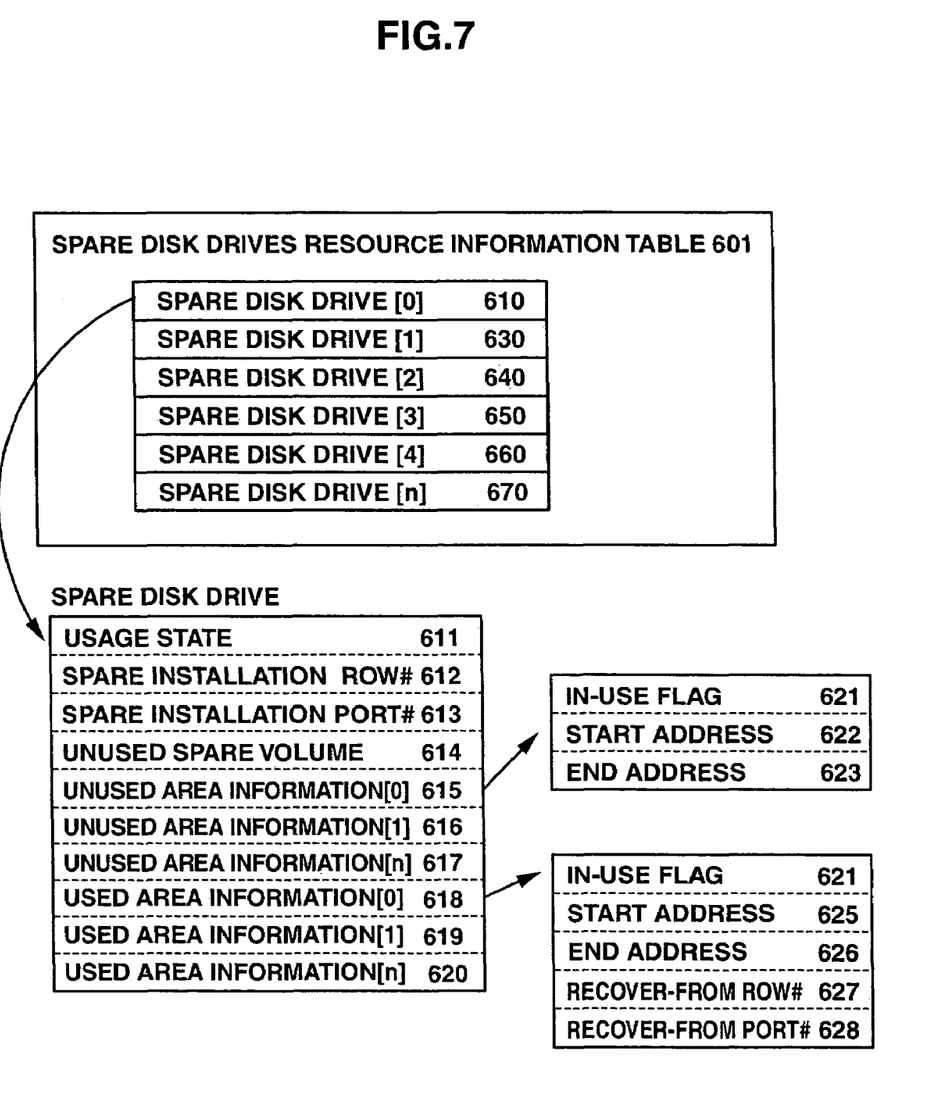
FIG. 7 shows a configuration of a spare-disk-drive resource information table.

Next, the configurations of the data the storage control system of the present invention refers to are explained with reference to FIGS. 6 and 7. FIG. 6 is a diagrammatic illustration of the structure of an all-disk-drives resource information table 500. FIG. 7 is a diagrammatic illustration of the structure of a spare-disk-drives resource information table 601.

The all-disk-drives resource information table 500, existing in the shared memory 120 (FIG. 1), is a table for managing the usage states and capacities of all the disk drives in the system, and is composed of an all-disk-drives unit-management area 510. As shown in FIG. 6, the all-disk-drives unit-management area 510 has an array data configuration and stores information regarding the condition of all the disk drives in the system, their capacities, and recovered data capacities that indicate the progress of data recovery to spare disk drives.

In a usage state area 510a, any one of four flags indicating a non-usage state, a data disk usage state, a spare disk usage state, and an unused state is set. The non-usage state indicates a state where a HDD board has not been installed in the system (a slot in the system) to start with, or a state where a faulty disk drive has been pulled out during replacement. The unused state indicates a state where a disk drive has been installed but is not used as a RAID disk drive or a spare disk drive.

A total capacity area 510b indicates the capacity of an installed disk drive and is used in the recovery information calculation for recovering data to a spare disk drive.

A recovered volume area 510c indicates how much of the total capacity of a disk drive has been recovered to a spare disk drive when a failure occurs in the disk drive, and is used for recovering data to a spare disk drive.

The spare-disk-drives resource information table 601 exists in the shared memory 120 and manages the condition of the spare disk drives (see 300A to 302A in FIG. 5(A)). As shown in FIG. 7, this table is composed of spare disk drive information [0] to [n] (610 to 670).

The spare disk information [0] to [n] (610 to 670) areas individually store specific information on the spare disk drives, each piece of specific information being composed of usage state 611, a spare installation ROW# 612, a spare installation PORT# 613, an unused spare volume 614, free space information [0] to [n] (615 to 617), and occupied space information [0] to [n] (618 to 620).

The usage state 611 area indicates the usage state of a relevant spare disk drive, has any one of three values of unused, partially used, and wholly used, and is used for determining whether to use the relevant spare disk drive for data recovery or not.

The spare installation ROW# 612 and the spare installation PORT# 613 areas indicate an installation position of the relevant spare disk drive and a value entered in this section indicates the location of the relevant spare disk drive in the arrays.

The free space information areas [0] to [n] (615 to 617) are for managing areas inside the relevant spare disk drive that are not used for data recovery and indicate whether they are currently in use; each area is composed of: a usage flag 621 indicating whether or not a relevant free space is currently in use; a start address 622 of the relevant free space and an end address 623 thereof. When the relevant free space is not currently in use, the in-use flag 621 is set to be "0".

The occupied space information areas [0] to [n] (618 to 620) are areas (mapping tables) indicating for which disk drives occupied spaces in the spare disk drive are individually used. Each area is composed of: a usage flag 624 indicating whether or not a relevant occupied space is currently in use; a start address 625 of the relevant occupied space; an end address 626 of the same; and a recovery-from ROW# 627 and recovery-from PORT# 628 indicating for which disk drive's data recovery the relevant occupied space is used. By means of the recovery-from ROW# 627 and the recovery-from PORT#628, plural collection-copy-from disk drives belonging to a relevant RAID group are mapped on to the relevant spare disk drive.

Now, explanations will be given for a series of operations executed, when a failure occurs in any of the disk drives constituting the RAID configuration, to recover data in a faulty disk drive to a spare disk drive and copy back the recovered data to a replacement disk drive. This series of operations is executed by the micro processor in a relevant disk control unit 140 based on a micro program therein (FIG. 1). The series of operations is composed of routines of: discovery and reporting of a faulty disk; commencement and termination of the collection copy; and commencement and termination of copy-back.

Figure 8:
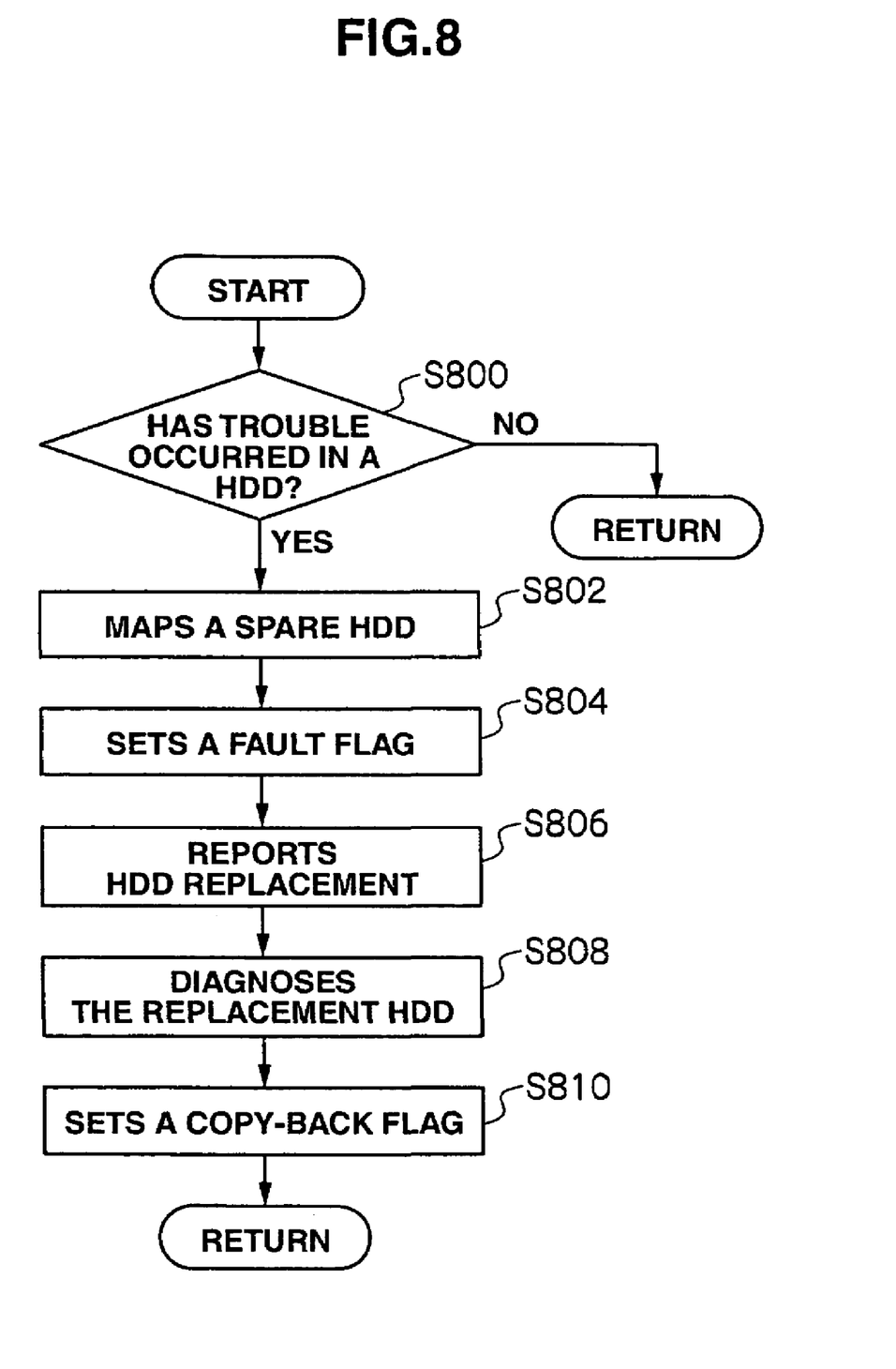
FIG. 8 is a flow chart indicating a fault detection routine for detecting faults in HDDs.

FIG. 8 shows a routine executed by the relevant disk control unit 140 (FIG. 1) regarding the discovery and reporting of a faulty disk. Every time an I/O failure of any kind, such as a write error to hard disk(s) or a read error from storage device(s) occurs, the relevant disk control unit 140 makes a record to that effect in a unit-management area for the relevant disk drive in the all-disk-drives resource information table 500 (FIG. 6). The number of occurrences of errors is updated and recorded in this area. The relevant disk control unit monitors the error number at all times and when the error number exceeds a threshold value, it judges that a failure has occurred in the relevant disk drive (S800).

When this judgment is made, the relevant disk control unit refers to the spare-disk-drives resource information table (FIG. 7), selects a spare disk drive to which the information in the faulty disk drive can be stored, and determines that this spare disk drive should be mapped on to the RAID group including the faulty disk. This mapping information is written to an area of the relevant spare disk drive in the spare-disk-drives resource information table (S802).

When the faulty HDD is detected, logically the relevant disk control unit closes the faulty HDD and at the same time sets a flag indicating the occurrence of a failure in the HDD in the unit-management area (FIG. 6) for the faulty HDD (S804). Then, the relevant disk control unit reports the information relating to the occurrence of the failure and the position of the HDD (S806) to the management terminal 160

(FIG. 1). Seeing this report, the maintenance person may replace the faulty HDD board with a normal one immediately. Usually, at the report stage, the aforementioned collection copy has been started, however, regardless of whether the collection copy is complete or in progress, the maintenance person can replace the faulty HDD board with a new one.

Replacement is conducted as follows. The relevant disk control gives a power-off command to a power source circuit on the faulty HDD board and lights an LED on the faulty HDD board so that the replacement-requiring HDD board can be recognized easily. When the maintenance person recognizes the lighted LED and pulls the faulty HDD board from its slot, a connection signal indicating the connection between the slot and the faulty HDD board is cancelled, and accordingly, the relevant disk control unit detects that the faulty HDD board has been removed.

Subsequently, when the maintenance person inserts a new board into the slot, the relevant disk control unit detects when the connection signal indicating the connection between the slot and the new HDD board becomes active, powers on the new HDD board, starts a diagnosis program for the replacement HDD (S808), and executes diagnosis. If the relevant disk control unit diagnoses that the replacement HDD is normal, it sets, in the unit-management area (FIG. 6) for the relevant disk drive, a flag indicating that, after the completion of the collection copy to the spare disk drive, the data which has been recovered in the spare disk drive is to be copied back to the replacement HDD (S810); clears the data in the error number storage area in the unit-management area for the relevant disk drive; and completes the routine in FIG. 8. If the replacement HDD is defective, a message suggesting replacement with another HDD is shown on a management terminal screen. Incidentally, the routine in FIG. 8 is carried out again and again as a result of timer interruption processing.

Now, the operation for the collection copy is explained. The micro program in the relevant disk control unit judges whether or not a fault flag (障害フラグ) (S802 in FIG. 8) is set, and when it is set, it refers to the all-disk-drives resource information table 500 (FIG. 6) and maps a spare disk drive on to the remaining HDDs constituting the RAID group to which the faulty HDD belongs (S902). A spare disk drive to be mapped is determined by the relevant disk control unit with reference to the information table in FIG. 7. The mapping information is set, as mentioned, in the information table in FIG. 7. Incidentally, the collection copy may involve plural spare disk drives.

Figure 5B:
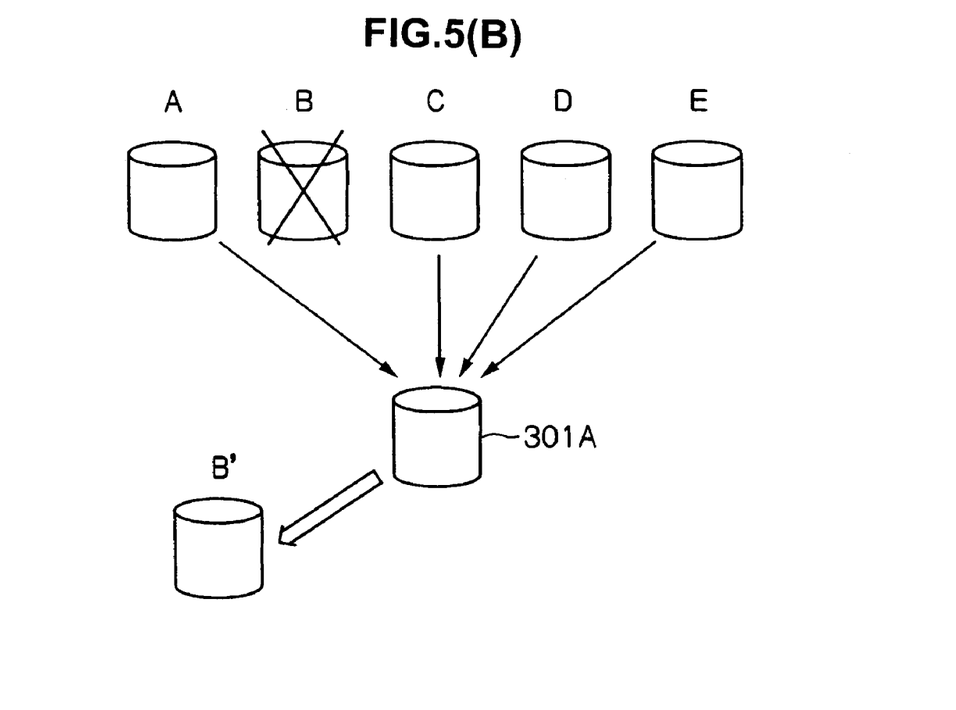
Figure 9:
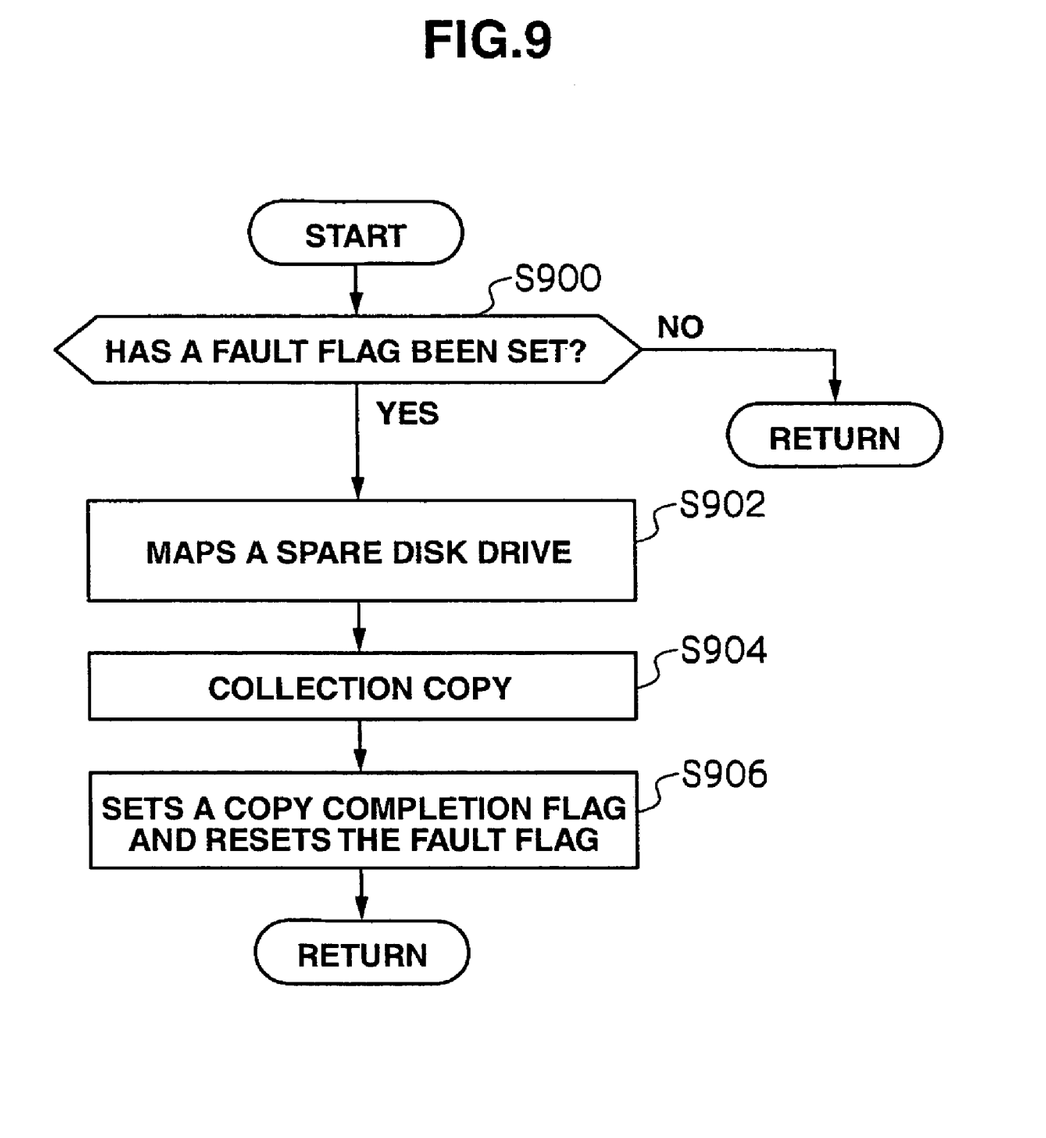
FIG. 9 is a flow chart indicating a routine for executing collection copy to a spare HDD.

Then, as FIG. 5(B) shows, the relevant disk control unit recovers the data in the logical volume of the faulty HDD using parity bits of the remaining HDDs in the same RAID group and copies the recovered data to the spare disk drive (S904). The relevant disk control unit monitors the completion of the collection copy and, upon completion, it sets a collection copy completion flag in a predetermined position in the unit-management area for the faulty HDD, resets the fault flag (S906), and returns to the beginning of this procedure. The routine in FIG. 9 starts upon the setting of the fault flag.

Figure 10:
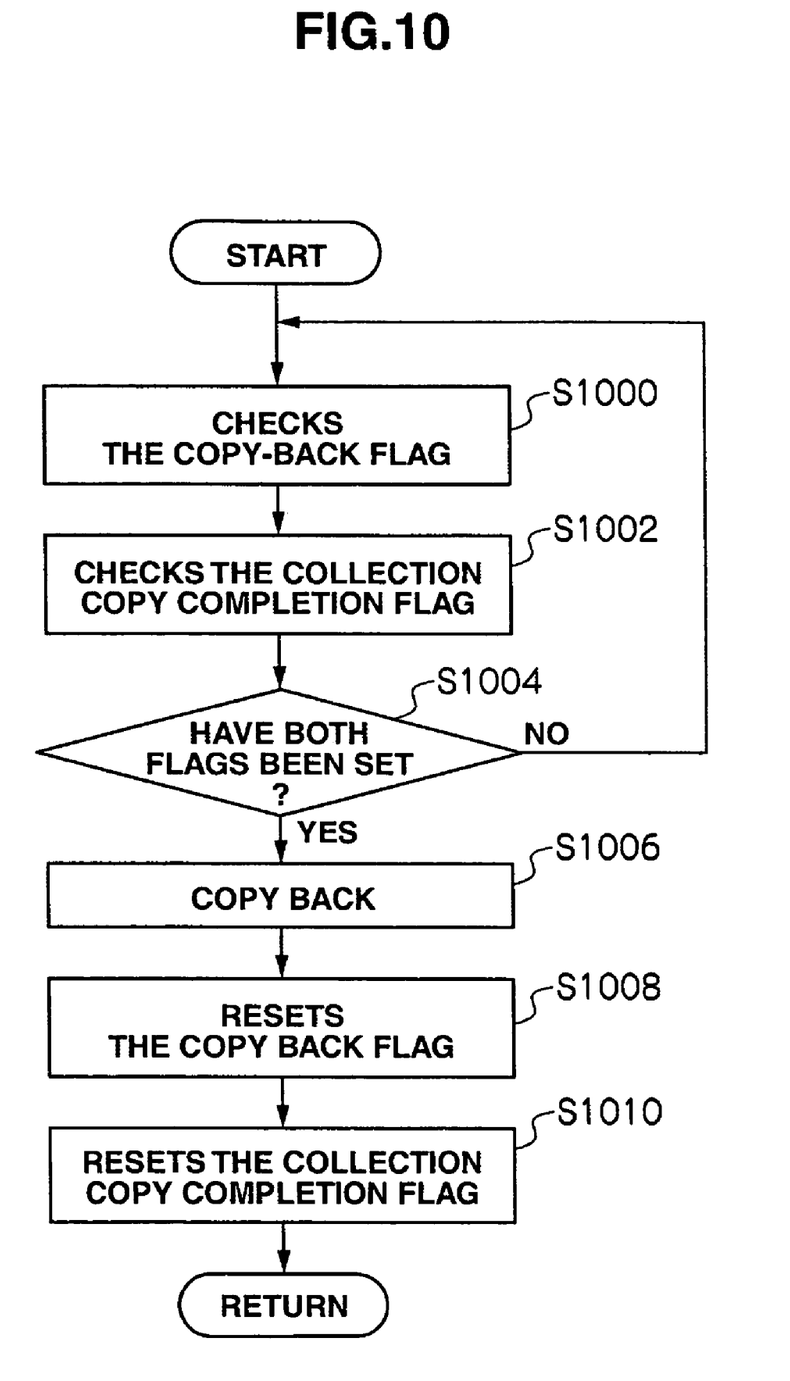
FIG. 10 is a flow chart indicating a routine for executing copy-back of data from a spare HDD to a replacement HDD.

FIG. 10 is a copy-back processing routine. The relevant disk control unit reads the copy-back flag (S810) (S1000), reads the collection copy completion flag (S1002), and judges whether or not both flags have been set (S1004). If both flags have been set, it executes the copy-back of data from the spare disk drive to the replacement disk drive (S1006).

After the completion of the copy-back, the relevant disk control unit resets the copy-back flag (S1008) and further resets the collection copy completion flag (S1010). When the judgment in S1004 is negative, the disk control unit returns to S1000. The routine in FIG. 10 starts, for example, according to the timer interruption processing.

Supposing that a failure occurs in a HDD, a relevant disk control unit 140 waits for the collection copy and replacement of the faulty HDD to be completed, S1000 through S1004, and then starts the copy-back. If the faulty disk drive has been replaced before the completion of the collection copy, a copy-back flag in S1000 will have been set (see S810 in FIG. 8); accordingly, the copy-back starts immediately after the completion of the collection copy. Therefore, the spare disk drive can be released without delay and may be used immediately for data recovery processing for another faulty disk drive's data. In other words, the drive condition of the spare disk drive which has been used for data recovery for the faulty disk drive is changed or returned to its original state so that the spare disk drive can be ready for another disk drive failure.

In the embodiment explained so far, it is configured so that the copy-back starts after the completion of the collection copy, however, the copy-back may start immediately after the replacement of the faulty disk drive. In this case, of the storage capacity of the spare disk drive, areas where the collection copy has been completed are copied back to the replacement disk drive. Data which has not yet been collection-copied to the spare disk drive may be collection-copied to the replacement disk drive.

The relevant disk control unit stores, in the cache memory 130, the data group that could not be written to the faulty disk drive. The relevant disk control unit checks whether or not the data group exists in the cache memory and if it does, copies the data to the spare disk drive according to the routine in FIG. 9. The relevant disk control unit may judge the completion of this copy as the completion of the collection copy.

Incidentally, when a host system makes an I/O request to the relevant disk control unit during its execution of the collection copy or copy-back, the I/O request may be judged as valid, and prevail over the collection copy or the copy-back.

In the above embodiment, the relevant disk control unit recognizes the replacement of the disk drive during copying of the data to the spare disk drive. However, the replacement of the disk drive may be recognized before starting any copying. Moreover, although the embodiment was explained using HDDs as examples of storage media, other storage media such as optical disks and tapes may also be used in the present invention.

What is claimed is:

1. A storage control system comprising a storage device and a controller for controlling data transmission between the storage device and a host system, the storage device comprising a plurality of storage media together constituting a RAID group, and a spare medium to which storage information in a faulty storage medium is saved;

wherein, the controller executes, based on a control program, the steps of:
(a) detecting a failure in the storage media;
(b) recovering storage information in the faulty storage medium based on storage information in the remaining storage media in the RAID group, and copying the storage information to the spare medium;
(c) reporting the failure in the storage medium to a management terminal;
(d) before all storage information in the faulty storage medium is copied to the spare medium, detecting the faulty storage medium's having been replaced with another storage medium; and
(e) conditional on the detection in step (d), copying back the storage information in the spare medium to the replacement storage medium;

wherein, upon detecting the replacement with the other storage medium in step (d), the controller immediately copies back the storage information in the spare medium to the other replacement storage medium even before the completion of the copying of all storage information in the faulty medium to the spare medium.

2. The storage control system according to claim 1, wherein the controller comprises a storage area for storing a data group, of data transmitted from the host system, that cannot be written to the storage device, executes a further step of detecting the completion of writing of this data group to the spare medium, and, after the detection, copies back the storage information in the spare medium to the other replacement storage medium.

3. The storage control system according to claim 1, wherein the controller further executes a step of mapping the spare medium on to the RAID group that includes the faulty storage medium.

4. A storage control system comprising:
a channel control unit for controlling an I/O request to a storage device in response to a data input/output request from a host system;
a disk control unit for controlling the data I/O request to the storage device;
a shared memory for storing control information;
a cache memory for temporarily storing control data;
a disk storage device as the storage device connected to the disk control unit; and
a connector connecting the channel control unit, the disk control unit, the shared memory, and the cache memory to one another,
the disk storage device comprising a plurality of disk drives constituting a RAID group and a spare disk drive to which storage information in a faulty disk drive is saved, wherein,
the shared memory comprises:
a first area for storing information regarding a fault in the disk drives and the position of the faulty disk drive;
a second area for storing information for mapping the remaining disk drives in the RAID group to which the faulty disk drive belongs, on to the spare disk drive; and
a third area for storing control information indicating that the faulty disk drive has been replaced with another disk drive before the coping of all storage information in the faulty disk drive to the spare disk drive has been completed; and
the disk control unit executes the steps of:
based on the information in the first area, reporting the disk drive fault to a management terminal;
based on the information in the second area, recovering the storage information in the faulty disk drive based on storage information in the remaining disk drives in the RAID group and copying the recovered storage information to the spare disk drive; and
based on the information in the third area, copying back the storage information in the spare disk drive to the replacement disk drive;
wherein, upon the third area indicating detecting replacement with the replacement disk drive, immediately copying back the recovered storage information in the spare disk drive to the replacement disk drive even before the completion of the copying of all of the recovered storage information of the faulty disk drive to the spare disk drive.

5. A storage control method for controlling data transmission between a storage device and a host system, the storage device comprising a plurality of storage media together constituting a RAID group and a spare medium to which storage information in a faulty storage media is saved, the method comprising:
(a) detecting a failure in the storage media;
(b) recovering the storage information in the faulty storage media based on storage information in the remaining storage media in the RAID group and copying the recovered storage information to the spare medium;
(c) reporting the failure in the storage medium to a management terminal;
(d) before the copying of all the recovered storage information in the faulty storage medium to the spare medium is completed, detecting the faulty storage media having been replaced with a replacement storage medium; and
(e) conditional on the detection in operation (d), copying back the recovered storage information in the spare medium to the replacement storage medium;
wherein, upon detecting the replacement with the replacement storage medium in operation (d), immediately copying back the recovered storage information in the spare medium to the other replacement storage medium even before the completion of the copying of all recovered storage information of the faulty medium to the spare medium.

6. The method according to claim 5, wherein
step (d) is a step of detecting the faulty storage medium's having been replaced with the other storage medium during the copying of all storage information in the faulty storage medium to the spare medium.

7. The storage control system according to claim 1, wherein, upon detecting the replacement with the replacement storage medium in step (d), the controller discontinues copying of further recovered said storage information of the faulty storage medium to the spare medium, and further recovered said storage information which has not been copied to the spare medium is copied directly to the replacement storage medium.

8. The storage control system according to claim 7, wherein upon completion of copying back any of the storage information in the spare medium to the replacement storage medium, immediately releasing the spare medium for use in other storage medium failures, even before the completion of the copying of the further recovered said storage information to the replacement storage medium.

9. The storage control system according to claim 4, wherein, upon the third area indicating detecting replacement with the replacement disk drive, discontinue copying of further said recovered storage information of the faulty disk drive to the spare disk drive, and further said recovered storage information which has not been copied to the spare disk drive is copied directly to the replacement disk drive.

10. The storage control system according to claim 9, wherein upon completion of copying back any of the recovered storage information in the spare disk drive the replacement disk drive, immediately releasing the spare disk drive for use in other storage disk drive failures, even before the completion of the copying of further said recovered storage information to the replacement disk drive.

11. The storage control method according to claim 5, wherein, upon detecting the replacement with the replacement storage medium in operation (d), discontinue copying of further said recovered storage information of the faulty medium to the spare medium, and further said recovered storage information which has not been copied to the spare medium is copied directly to the replacement storage medium.

12. The storage control method according to claim 11, wherein upon completion of copying back any of the storage information in the spare medium to the replacement storage medium, immediately releasing the spare medium for use in other medium failures, even before the completion of the copying of the further said recovered storage information to the replacement storage medium.

* * * * *